United States Patent Office 3,576,008
Patented Apr. 20, 1971

3,576,008
SYNTHESIS OF 2 - HYDROXY-2,6,6-TRIMETHYL-CYCLOHEXYLIDENE ACETIC ACID, γ-LACTONE
Joseph N. Schumacher, Winston-Salem, N.C., assignor to R. J. Reynolds Tobacco Company, Winston-Salem, N.C.
No Drawing. Filed Jan. 29, 1968, Ser. No. 701,104
Int. Cl. C07d 5/06
U.S. Cl. 260—343.3
5 Claims

ABSTRACT OF THE DISCLOSURE

Synthesis of 2 - hydroxy - 2,6,6 - trimethylcyclohexylidene acetic acid, γ-lactone wherein β-ionone is irradiated with ultraviolet light and the resulting irradiated product is oxidized to 2-hydroxy-2,6,6-trimethylcyclohexylidene acetic acid, γ-lactone.

---

This invention relates to a novel method of synthesizing 2 - hydroxy - 2,6,6 - trimethylcyclohexylidene acetic acid, γ-lactone.

The chemical, 2 - hydroxy - 2,6,6 - trimethylcyclohexylidene acetic acid, γ-lactone, known also as dihydroactinidiolide, is a useful chemical. Among other uses, this chemical as well as its saturated analog, 2 - hydroxy-2,6,6-trimethylcyclohexyl acetic acid, γ-lactone (also known as tetrahydroactinidiolide), have been found by others to possess useful pharmacological properties and particularly they have been found useful as analeptic agents for treating respiratory depression. It is, of course, desirable and thus it is a principal object of this invention to provide methods whereby dihydroactinidiolide can be synthesized in good yields.

In accordance with the present invention β-ionone is subjected to ultraviolet radiation to convert the β-ionone to 6,7,8,8a - tetrahydro - 2,5,5,8a - tetramethyl - 5H - 1 - benzopyran, which product is then oxidized to dihydroactinidiolide.

The reactions involved in the present synthesis can be illustrated as follows:

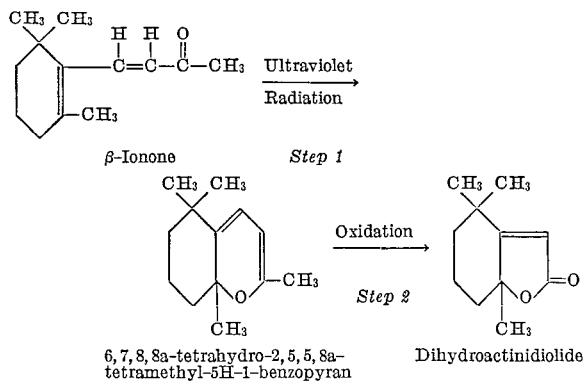

Preferably, the β-ionone starting material is dissolved in a solvent such as alcohols and the like and subjected to ultraviolet radiation until a substantial conversion of β-ionone to 6,7,8,8a - tetrahydro - 2,5,5,8a - tetramethyl-5H-benzopyran is achieved. Generally speaking, equilibrium is obtained with no further conversion of β-ionone after irradiating the solution for approximately 72 hours, at which time the irradiation can be terminated. While the ultraviolet irradiation of β-ionone can be carired out at ambient or room temperature, it is preferably carried out at an elevated temperature from about 25 to 60° C. and more preferably at a temperature from 50 to 60° C.

By irradiating at elevated temperatures, step 1 of the synthesis is facilitated. Likewise, the amount of β-ionone and the intensity of ultraviolet radiation determines the time required for accomplishing step 1 of the synthesis. With a substantially small amount of β-ionone and strong ultraviolet radiation, step 1 can be accomplished in shorter periods, such as a matter of hours. The optimum period for irradiation of the β-ionone to obtain substantial conversion can be readily determined taking into consideration these factors.

After separation of 6,7,8,8a - tetrahydro - 2,5,5,8a-tetramethyl - 5H - 1 - benzopyran from the reaction mixture, this intermediate is then oxidized using air or oxygen. Compressed air affords higher yields and is thus preferred. For this oxidation the 6,7,8,8a - tetrahydro-2,5,5,8a - tetramethyl - 5H - 1 - benzopyran is dissolved in a solvent such as alcohols, benzene, hexane and the like and air or oxygen introduced therein. The oxidation can be effected at ambient temperatures or temperatures below ambient but is preferably carried out at elevated temperatures such as 30 to 80° C. and more preferably 70 to 75° C. The time required for the oxidation varies depending upon the temperature employed; with the use of elevated temperatures the oxidation is accomplished more readily, such as, for example, in about 3 days or less, while with the use of low temperatures 6 or more days are sometimes required for completion of the oxidation. After the oxidation is complete the solvent is removed and the dihydroactinidiolide can be recovered and recrystallized if desired.

The following examples illustrate in detail the synthesis method of the invention.

EXAMPLE 1

A solution of 300 grams of β-ionone (92% purity) in 4500 milliliters of absolute ethanol was irradiated using a quartz filter and a 200-watt Hanovia mercury vapor quartz lamp. The β-ionone-ethanol solution was constantly stirred and kept at 55–60° C. with the aid of an oil bath (90–95° C.) throughout the irradiation. The amount of oxide formed in the reaction was determined every 24 hours by gas chromatography. Equilibrium was reached after 72 hours. The solvent was removed under reduced pressure to give 300 grams of irradiation product which was fractionated on a helix-packed column (35 x 1.5 centimeters) at 17 millimeters mercury pressure. Results are recorded in Table I. The yield of oxide based on unrecovered β-ionone was 83.6%.

TABLE I.—DISTILLATION OF IRRADIATION PRODUCT

| Fraction | Pot temperature °C. | Column temperature, °C. | Distillation temperature °C. | Weight, grams | Remarks |
|---|---|---|---|---|---|
| 1 | 137–39 | 117–18 | 70–110 | 1.1 | Forerun. |
| 2 | 139–50 | 118–26 | 114–18 | 143.5 | (¹) |
| 3 | 150–55 | 126–32 | 118–30 | 3.8 | Intermediate. |
| 4 | 155–91 | 132–42 | 130–38 | 122.1 | β-Ionone. |
| Pot residue | | | | 26.5 | |

¹ 6,7,8,8a-tetrahydro-2,5,5,8a-tetramethyl-5H-1-benzopyran.

EXAMPLE 2

Following the procedure of Example 1, 452 grams of β-ionone was dissolved in 4500 milliliters of ethanol. This solution was irradiated for 72 hours with a 450-watt Hanovia mercury vapor quartz lamp. A 60% conversion of β-ionone to 6,7,8,8a-tetrahydro-2,5,5,8a-tetramethyl-5H-1-benzopyran was obtained.

EXAMPLE 3

Twenty grams of 6,7,8,8a - tetrahydro - 2,5,5,8a - tetramethyl-5H-1-benzopyran was dissolved in 25 milliliters of benzene cooled in an ice bath and the solution was aerated with compressed air. After aeration for one day there was found dihydroactinidiolide together with a crystalline product (identified by infrared spectrum as 2,3-dihydroxy-2,3,6,7,8,8a-hexahydro - 2,5,5,8a - tetramethyl-5H-1-benzopyran). The ice bath was removed and the aeration continued with the result that the said crystalline product was converted to dihydroactinidiolide. After six days, gas chromatography showed that the dihydroactinidiolide formation reached a maximum. The solvent was removed and the residue was distilled at one millimeter of mercury pressure to give 10.2 grams of crude dihydroactinidiolide. The crude dihydroactinidiolide was dissolved in 3:1 pentane-ether and cooled to −15° C. The crystals that formed were filtered on a Buchner funnel and the mother liquid re-cooled to obtain additional crops of crystals. Total yield of dihydroactinidiolide was 4 grams or 21% of theory.

EXAMPLE 4

In a manner similar to Example 3, 20 grams of 6,7,8,8a-tetrahydro-2,5,5,8a-tetramethyl - 5H - 1 - benzopyran was aerated with compressed air in 25 milliliters of benzene at room temperature. The oxidation was fairly rapid, going almost to completion in one day. After three days the benzene was removed and the residue was distilled under reduced pressure to give 11.7 grams of crude dihydroactinidiolide; crystallization as in Example 3 gave 5.7 grams of pure dihydroactinidiolide (30% of theory).

EXAMPLE 5

Twenty grams of 6,7,8,8a-tetrahydro - 2,5,5,8a - tetramethyl-5H-1-benzopyran was dissolved in 80 milliliters of benzene and the resulting solution was aerated with compressed air at 70–80° C. The oxidation was fairly rapid, but was continued for three days. Removal of the solvent followed by distillation and crystallization gave pure dihydroactinidiolide in 30% yield.

EXAMPLE 6

Twenty grams of 6,7,8,8a - tetrahydro - 2,5,5,8a - tetramethyl-5H-1-benzopyran was dissolved in 80 milliliters of ethanol and the resulting solution was aerated with compressed air at 70–80° C. The oxidation was fairly rapid, but was continued for three days. Removal of the solvent followed by distillation and crystallization gave pure dihydroactinidiolide in 30% yield.

EXAMPLE 7

In a number of runs ten grams of 6,7,8,8a-tetrahydro-2,5,5,8a-tetramethyl-5H-1-benzopyran was dissolved in from 100 to 500 milliliters of benzene or ethyl alcohol or hexane. The resulting solutions were oxidized with pure oxygen at 25° C. The oxidation was carried out for 2 days. Removal of the solvent followed by distillation and crystallization gave pure dihydroactinidiolide in yields of from 15 to 20%.

Dihydroactinidiolide can be converted to tetrahydroactinidiolide, 2-hydroxy-2,6,6-trimethylcyclohexyl acetic acid γ-lactone, by catalytic hydrogenation. For this conversion dihydroactinidiolide is dissolved in acetic acid. The following example illustrates this conversion.

EXAMPLE 8

Ten and five-tenths grams of dihydroactinidiolide was dissolved in 50 milliliters of acetic acid and placed in a Parr hydrogenation bottle along with a catalytic amount of platinum oxide. A pressure of 50 pounds was applied and the hydrogenation was allowed to proceed for 18 hours. The reaction mixture was filtered, diluted with 100 milliliters of water, and extracted with five 30-milliliter portions of hexane. The hexane extracts were combined, washed with 5% sodium carbonate solution and with water, dried over anhydrous sodium sulfate, and concentrated. The residue, 10 grams, was crystallized from a pentane-ether solution and recrystallized twice from the same solvent to provide 7.1 grams of pure tetrahydroactinidiolide having a melting point of 78–80° C.

The advantages of the invention are apparent from the foregoing. The present invention provides a novel method for synthesizing dihydroactinidiolide in good yields from an available starting material. The synthesis method of the invention can be conducted readily.

Those modifications and equivalents which fall within the spirit of the invention and the scope of the appended claims are to be considered part of the invention.

I claim:

1. A process of synthesizing 2-hydroxy-2,6,6-trimethylcyclohexylidene acetic acid, γ-lactone which comprises subjecting β-ionone to ultraviolet radiation to convert the β-ionone to 6,7,8,8a-tetrahydro-2,5,5,8a-tetramethyl-5H-1-benzopyran, separating the so-formed 6,7,8,8a-tetrahydro-2,5,5,8a-tetramethyl-5H - 1 - benzopyran, oxidizing 6,7,8,8a-tetrahydro-2,5,5,8a-tetramethyl - 5H - 1 - benzopyran by contacting it with air or oxygen to form 2-hydroxy - 2,6,6 - trimethylcyclohexylidene acetic acid, γ-lactone and recovering the so-formed 2-hydroxy-2,6,6-trimethylcyclohexylidene acetic acid, γ-lactone.

2. The process of claim 1 wherein the oxidizing is carried out at an elevated temperature.

3. The process of claim 1 wherein the oxidizing is carried out at ambient temperature.

4. The process of claim 1 wherein the oxidizing is carried out with air.

5. The process of claim 1 wherein the β-ionone is subjected to ultraviolet radiation at an elevated temperature.

References Cited

UNITED STATES PATENTS 3,321,488    5/1967    Los _____ 260—343.3

ALEX MAZEL, Primary Examiner

A. M. T. TIGHE, Assistant Examiner

U.S. Cl. X.R.

204—158